Jan. 23, 1934.  G. W. BROWN  1,944,212
MEANS FOR PHOTOGRAPHING BURGLARS OR OTHER INTRUDERS
Filed July 11, 1931  2 Sheets-Sheet 1

INVENTOR
George W. Brown
by J. K. Weatherford
ATTORNEY

Jan. 23, 1934. G. W. BROWN 1,944,212
MEANS FOR PHOTOGRAPHING BURGLARS OR OTHER INTRUDERS
Filed July 11, 1931 2 Sheets-Sheet 2
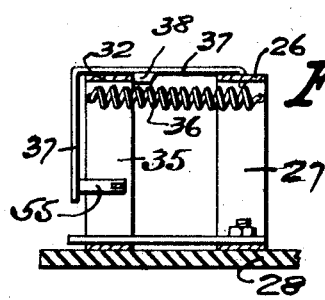
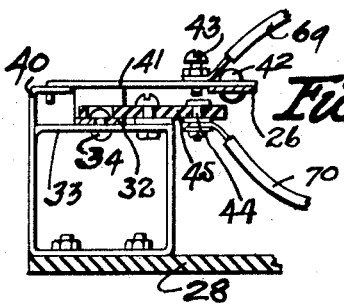
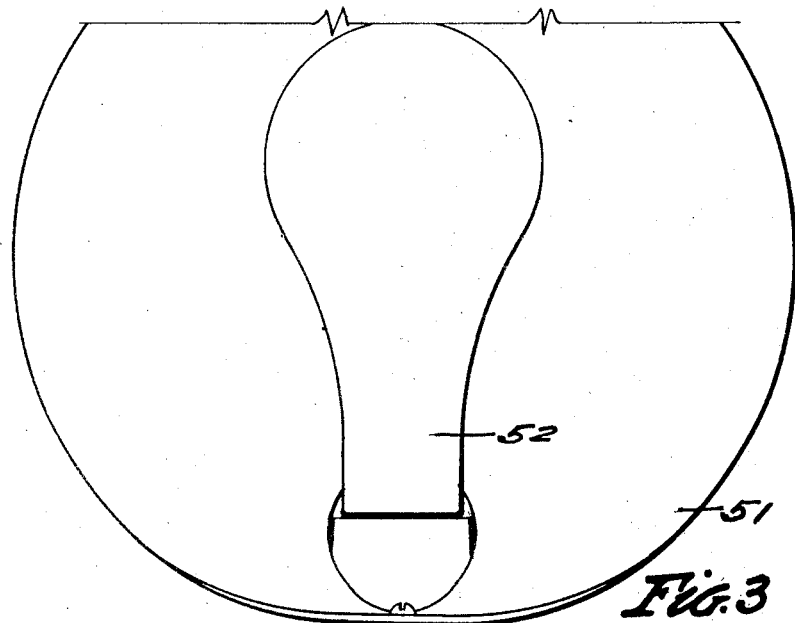
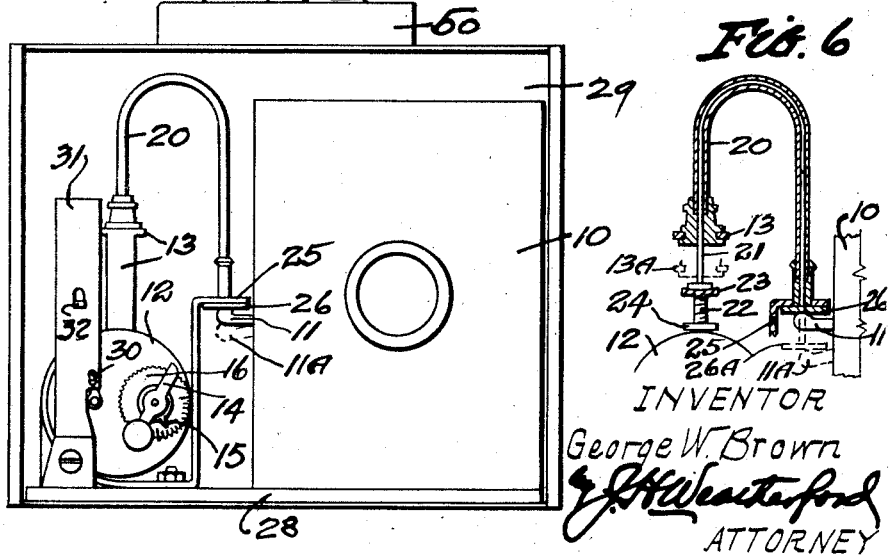
INVENTOR
George W. Brown
ATTORNEY Patented Jan. 23, 1934

1,944,212

UNITED STATES PATENT OFFICE 1,944,212

MEANS FOR PHOTOGRAPHING BURGLARS OR OTHER INTRUDERS

George W. Brown, Memphis, Tenn.

Application July 11, 1931. Serial No. 550,113

1 Claim. (Cl. 177—314)

This invention relates to a device for photographing burglars or other intruders and for making a photographic record of any person approaching a particular place.

The primary object of the invention is to provide means initiated by the approach of a person to a particular spot, for actuating a camera and flash light in synchronism to make a photograph of such person.

A further object is to provide a preliminary sound to attract the attention of the intruder, whereby such intruder will more surely face the camera and subsequently to actuate the camera and light.

The means by which the foregoing and other objects are accomplished and the manner of their accomplishment, will readily be understood from the following specification on reference to the accompanying drawings, in which:

Fig. 3 is an end elevation facing the camera;

Figs. 4 and 5 are fragmentary sections taken as on the lines IV—IV and V—V, of Fig. 1, respectively; and Fig. 6 is a fragmentary section taken on the line VI—VI of Fig. 2.

Figure 1:
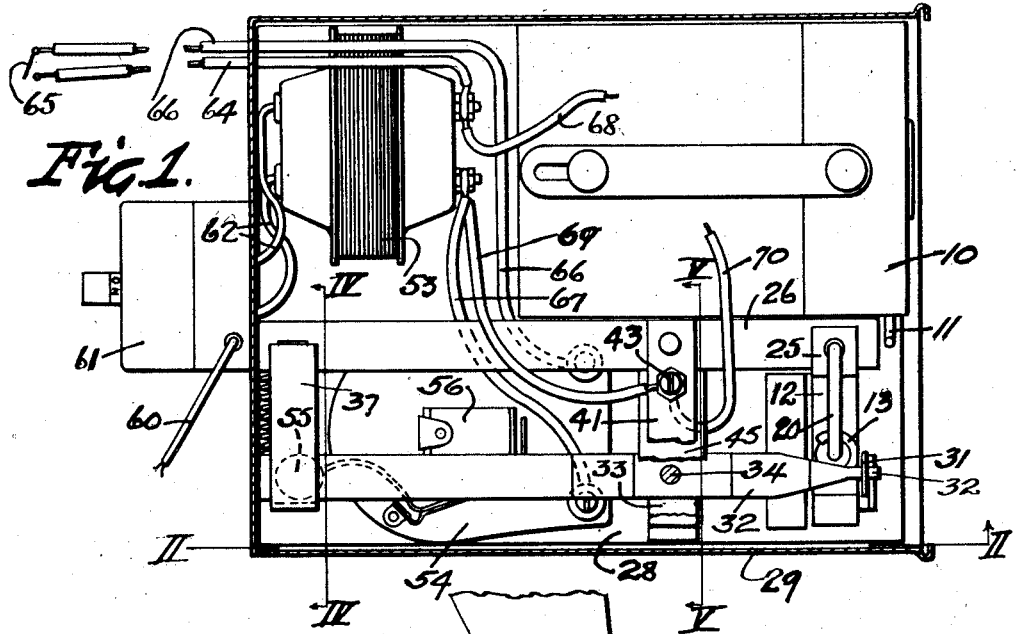
Fig. 1 is a sectional plan taken as on the line I—I of Fig. 2.
Figure 2:
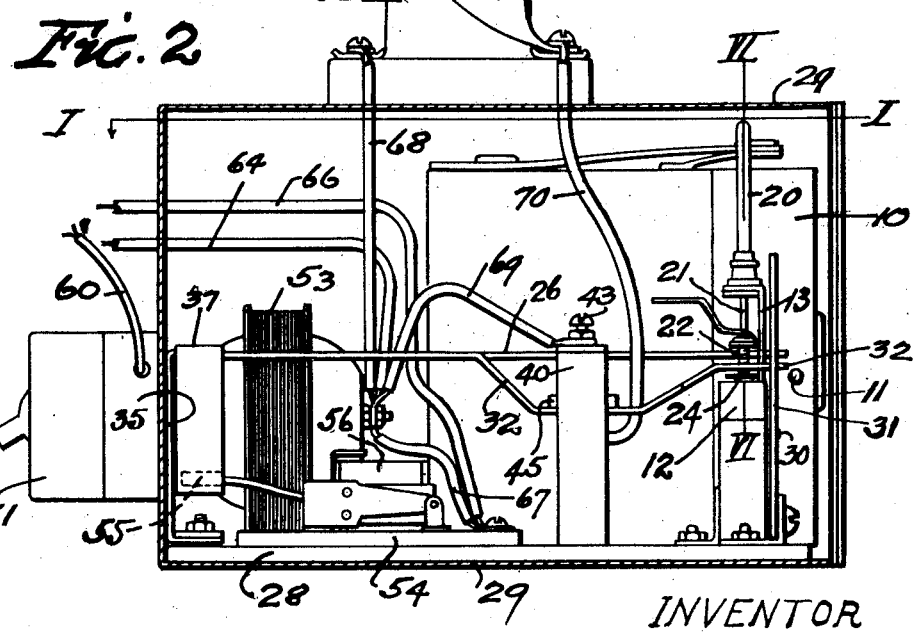
Fig. 2 is a sectional elevation taken as on the line II—II of Fig. 1.

Referring now to the drawings in which the various parts are indicated by numerals, 10 is a camera of any desired type, which is provided with means for opening and holding open the usual shutter to accomplish the exposure of the film. In the camera illustrated this is accomplished by depressing a button or trigger 11, holding it down during the desired exposure period, and releasing it to allow closure of the shutter. In Figs. 1 and 2, the camera is shown moved slightly forward from working position in order that the button 11 may be more clearly indicated.

A timing device is used for actuating and releasing the button 11. This device is purchasable in the open market and its detail forms no part of the present invention. It includes a casing 12 in which is disposed suitable actuating mechanism, a vertically movable bar 13, which is depressed, temporarily held down, and automatically released by this mechanism, a handle 14 for winding the mechanism, and a pointer 15 cooperating with index markings on a dial 16 for setting a time retention period, during which the shutter of the camera stays open. In this device also there is an elapsed time after the device is set in motion before depression of the bar occurs, but such period may be regulated at will by starting the device and allowing it to run for such portion of this period as may be desired and then stopping it.

Detachably secured to the bar 13, is one end of a flexible hollow cable 20 in which is slidably mounted a flexible rod or wire 21. The corresponding end of this wire extends beyond the end of the cable and rests on top of a post 22 extending upward from the casing 12. This post is threaded and provided with a collar or flange 23 by which it may be turned to adjust its vertical height and is also provided with a lock nut 24 by which it may be secured in any desired position of adjustment. The opposite end of the cable 20 is secured to and supported by a bracket 25, and the corresponding end of the wire 21 abuts against the top of a horizontally disposed bar 26 which extends rearwardly and is supported by a vertical member 27, the resiliency of the bar and member permitting such limited depression of the free end of the bar as may be desired. In working position the camera is moved back to bring the button 11 beneath this free end of the bar so that depression of the bar will depress the button.

28 is a base board of dielectric material by which the member 27 and bracket 25 and other parts are carried and to which they are secured. 29 is a box enclosing and protecting the various parts.

30 is a trigger projecting from the casing 12, by which the mechanism within the casing is released to set the mechanism in action. 31 is a lever engaging trigger 30. 32 is a trip lever or trip actuating the trigger 30. This trip is pivotally secured on a bracket 33, as by a pivot pin 34, and extends rearwardly therebeyond the back end of the casing, and thence a part 35 extends vertically downward to and rests on the base 28. 36 is a tension spring secured to the vertical member 27 and to the part 35. 37 is a latch bar hinged to the bar 26 and extending transversely and horizontally across the bar 32, and thence vertically downward toward the base 28. 38 is a lug on the latch bar 37 which is adapted to engage the bar 32 and hold it against the pull of the spring 36.

An upward extension 40 of the bracket 33, hingedly carries a horizontally disposed bar 41 which rests on and is secured to the bar 26 as by the rivet 42. 43 is a contact member secured to and projecting below the bar 41. 44 is a complementary contact which is mounted on a dielectric support 45 carried by the bracket 33.

50 is a light socket mounted on the box 29, 51 is a reflector and 52 a flash bulb of a type now in use in flash light photography. 53 is a transformer, 54 is a buzzer, having a clapper 55 which vibrates, when magnet 56 is energized. This clapper is so positioned that in vibrating it strikes sharply against the vertical portion of the latch bar 37.

60 is an incoming power line such as the ordinary 110 volt lighting circuit and 61 the control switch therefor. 62 are wires leading from the switch to the transformer 53. 64 is a low tension wire leading from the transformer to a switch 65 which when closed completes a circuit through the complementary wire 66 to and through the buzzer 54 and thence through the wire 67 to the transformer, to the flash bulb 52 are low tension wires 68 and 69, the latter of which leads to the normally separated contacts 43, 44 and from the latter through the wire 70 to the flash bulb.

The switch 65 is shown in the rear of the camera but will of course be located at such point as is necessary.

In using the device the box, containing the camera properly loaded with film, is positioned to point the camera toward the place at which it is desired to photograph an intruder as for instance toward a door or window through which entrance may be effected.

The switch 65 is mounted on such door or window so that opening it or entrance through it must close the switch.

When the switch is thus closed, the circuit is closed through the buzzer causing the same to sound and attract the attention of the intruder toward the sound. The buzzer at its first movement strikes the vertical portion of the latch 37, releasing the trip 32 and through the lever 31 actuating the trigger 30 to start the timing mechanism. This mechanism after a brief interval, measured in seconds, depresses the bar 13 to dotted position 13A, pulling the attached end of the hollow cable 20 downward on the wire 21, thus pushing the opposite end of the wire out of the cable and depressing the bar 26 and button 11 to the dotted positions 26A, 11A respectively, and opening and holding open the camera shutter.

Depression of the bar 26 also depresses the contact 43 against the contact 44 completing the circuit through the flash bulb and flashing same to furnish light for the exposure.

It is found that the buzzer sound causes the intruder involuntarily to look in the direction from which it comes and therefore face the camera.

It will be understood that the camera, the timing mechanism, flash bulb, transformer and buzzer are purchased in the open market so that no claim is made for their mechanism in detail, so that illustration of such detail is not believed to be necessary, and is therefore not made.

Having described my invention, what I claim is:

In a device for photographing an intruder, a camera having a shutter, a flash light, a buzzer including a vibratable striker, a source of electric current and open circuits therefrom to said buzzer and said light, a switch in said light circuit, a remote switch in said buzzer circuit, means operable by approach of said intruder to a position in front of said camera, cooperating with said switch to close same, whereby to complete said buzzer circuit and actuate said buzzer; a timing mechanism spaced from said buzzer, said mechanism having a projecting trigger, a trip lever extending between said timing mechanism and said buzzer and pivotally mounted intermediate its length, a link connecting said lever and said trigger, a spring acting on said lever to swing same and trip said trigger, a latch restraining said lever, said latch having an extension depending into proximity to the striker of said buzzer, said extension and latch being displaceable by action of said buzzer striker whereby actuation of said buzzer will trip said latch, and start said timing mechanism, means actuated by said timing mechanism for opening said camera shutter, and holding same open, said means closing said flash light switch to complete said flash light circuit and flash said light, and subsequently releasing said camera shutter to allow same to close.

GEORGE W. BROWN.